July 23, 1940.   H. A. STRINGFELLOW   2,208,862
LIQUID MEASURING AND DISPENSING DEVICE
Filed Aug. 15, 1938
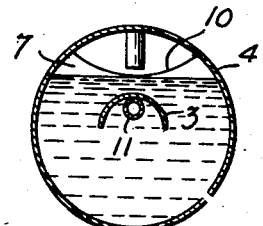
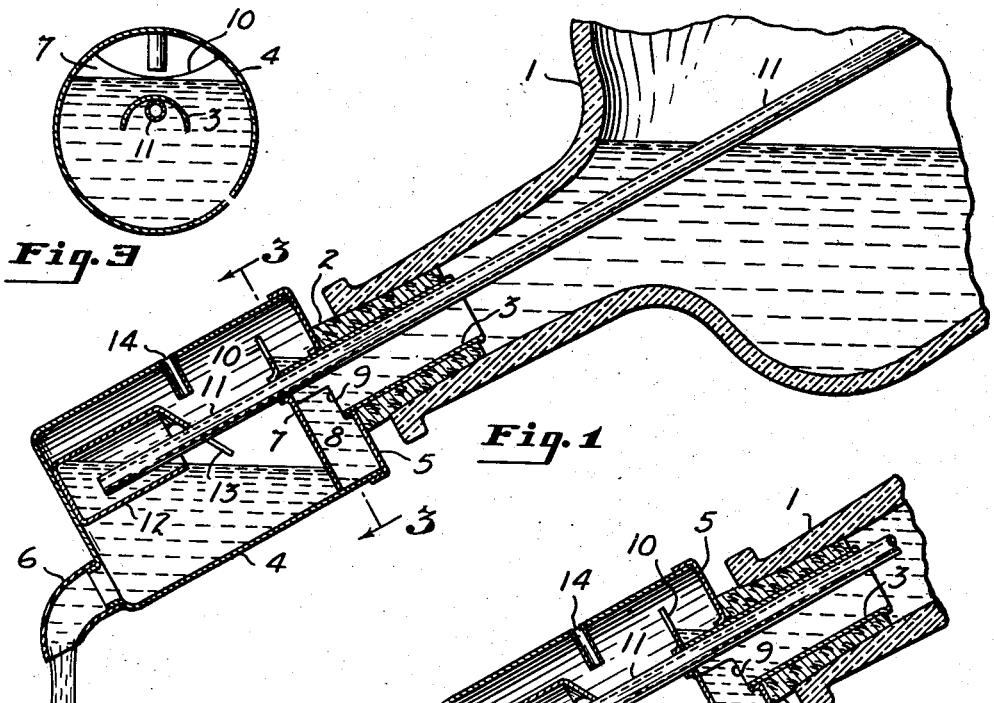
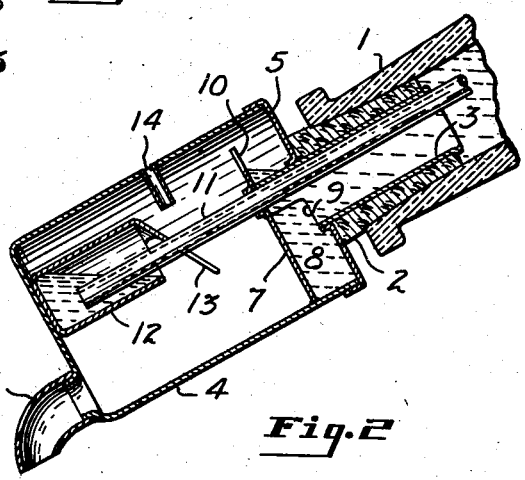
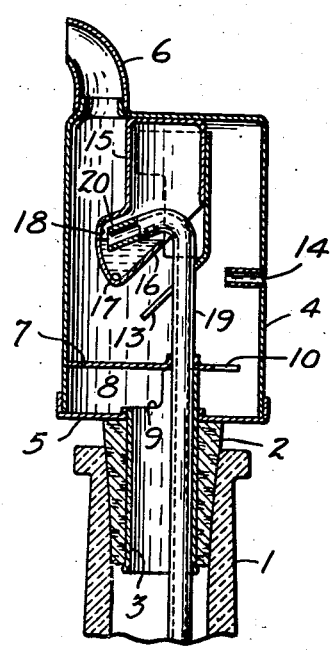
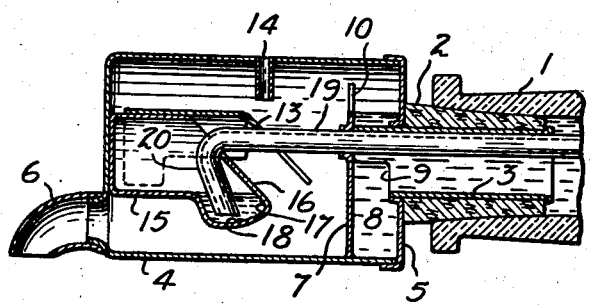
INVENTOR
HENRY A. STRINGFELLOW
BY
Evans + McCoy
ATTORNEYS Patented July 23, 1940

2,208,862

UNITED STATES PATENT OFFICE 2,208,862

LIQUID MEASURING AND DISPENSING DEVICE

Henry A. Stringfellow, New York, N. Y., assignor of one-half to Francis Irving Woodburn, Garden City, Long Island, N. Y.

Application August 15, 1938, Serial No. 224,875

6 Claims. (Cl. 221—147)

This invention relates to liquid measuring and dispensing devices of the type adapted to be attached to a supply container and which measures and delivers a predetermined quantity of liquid when tilted to pouring position.

This invention has for an object to provide a measuring device which is rapid in operation by reason of the fact that delivery of liquid through the pouring outlet commences immediately upon the tilting of the supply container and attached measuring device to pouring position.

A further object is to provide a liquid measuring device of the character referred to which is of simple, compact and inexpensive construction.

A further object is to provide a measuring device in which delivery of liquid is prevented until the device has been tilted to the proper pouring and measuring position.

With the above and other objects in view the invention may be said to comprise the device as illustrated in the accompanying drawing, hereinafter described and particularly set forth in the appended claims together with such variations and modifications thereof as will be apparent to those skilled in the art to which the invention appertains. Reference should be had to the accompanying drawing forming a part of this specification, in which:

Figure 1 is an axial section showing the measuring and dispensing device of the present invention attached to a bottle, the bottle and dispensing device being tilted to pouring position and the level of the liquid in the measuring receptacle having reached the flow cut-off level;

Fig. 2 is a view similar to Fig. 1 showing the liquid discharging from the measuring receptacle after flow from the bottle to the measuring receptacle has ceased;

Fig. 3 is a section taken on the line indicated at 3—3 in Fig. 1;

Fig. 4 is a sectional view showing a modified form of the invention, the measuring device and bottle being shown in upright position;

Fig. 5 is a sectional view showing the measuring device of Fig. 4 in horizontal position.

Referring to the accompanying drawing the device of the present invention is shown applied to a supply container in the form of a bottle 1. The bottle 1 is provided with a cork 2 through which extends a liquid discharge tube 3. The tube 3 supports a measuring receptacle 4 which is preferably of cylindrical form and which has an inner head 5 attached to the tube 3. The receptacle 4 has a pouring outlet 6 adjacent one side of its outer head. A partition 7 is provided in the receptacle 4 near head 5 thereof to provide a liquid inlet chamber 8. The tube 3 extends through the head 5 into the chamber 8 and has a discharge opening 9 facing the side of the receptacle 4 at which the pouring outlet 6 is located.

The partition 7 has an opening 10 adjacent the side of the receptacle 4 diametrically opposite the pouring outlet 6 which is of a cross-sectional area at least equal to that of the tube 3. The cross-sectional area of the pouring outlet 6 is materially less than that of the tube 3 so that the rate of discharge of liquid through the pouring outlet 6 is considerably slower than through the tube 3 which forms the inlet to the measuring receptacle. By reason of the slower discharge through the outlet 6 liquid will accumulate in the measuring receptacle during the pouring operation. Means is provided to cut off the flow of liquid from the supply container to the measuring receptacle upon the accumulation of a predetermined volume of liquid in the measuring receptacle and to then permit the accumulated liquid to discharge through the outlet, the quantity of liquid discharged upon each pouring operation being that which flows through the pouring outlet during the accumulation of the predetermined volume of liquid in the measuring receptacle plus the predetermined volume in the measuring receptacle. For admitting air to the bottle 1 or other liquid container to balance pressure and permit flow of liquid from the bottle into the measuring receptacle an air vent tube 11 extends through the tube 3 into the bottle and through the partition 7 into the measuring portion of the receptacle 4. Flow of liquid from the bottle to the measuring receptacle is stopped by cutting off the flow of air through the vent tube 11 and the sealing of the vent tube upon the accumulation of a predetermined volume of liquid in the container is accomplished by means of a liquid trap 12 in the outer end portion of the receptacle 4. The trap 12 is open at its inner end and is disposed substantially parellel to the axis of the receptacle so that it will retain liquid when the receptacle is tilted past the horizontal to a pouring position. The edge of the inner open end of the trap 12 on the side thereof toward the discharge outlet is preferably located substantially at the axis of the receptacle 4 and midway between the ends of the measuring chamber. The tube 11 extends into the trap 12 with its open outer end in a position to be submerged in liquid in the trap 12 when the liquid overflows into the trap as shown in Fig. 1. By reason of its tilted position the trap 12 retains sufficient liquid to seal the vent tube 11 as shown in Fig. 2 while the liquid is being discharged from the measuring chamber. When the bottle 1 is returned to upright position the trap 12 is emptied and the liquid discharged from the trap and that contained in the chamber 8 flows back into the bottle. By reason of the fact that the edge of the trap 12 over which the liquid flows into the trap is located at the center of the measuring chamber, the volume of liquid in the measuring chamber when the liquid begins to overflow into the trap will be the same for various pouring angles, and the angle at which the receptacle is tilted for pouring may be varied without materially affecting the measuring action.

The inlet chamber 8 causes the discharge end of the tube 3 to be submerged in liquid during pouring and reduces turbulence in the measuring container. A baffle 13 may be provided over the open end of the trap 12 to prevent spilling of liquid from the opening 10 into the trap. A small vent opening 14 may be provided in the receptacle 4 to maintain atmospheric pressure within the receptacle 4. In order to prevent loss of liquid through splashing, an inwardly directed tube may be positioned around the vent opening 14.

In Figs. 4 and 5 of the drawing a modified form of liquid trap is shown, the device being otherwise the same as that shown in Figs. 1 and 2.

The trap 15 shown in Figs. 3 and 4 has a re-entrant edge portion 16 at its inner end forming a recess 17 which will retain a small volume of liquid when the receptacle is in upright position. The side of the trap toward the pouring outlet 6 is bulged to provide a liquid retaining depression 18 and the air vent tube 19 has a laterally bent end portion 20 with its open end located in the depression 18 of the trap. When the bottle and measuring receptacle are tilted toward pouring position the liquid in the recess 17 flows into the depression 18 and seals the vent tube 19 while the receptacle is being tilted past horizontal position toward pouring position. As the receptacle comes to pouring position the liquid flows from the depression 18 to the inner end of the trap permitting air to enter the vent tube whereupon liquid starts to flow from the bottle into the measuring receptacle. The flow continues until overflow of liquid into the trap again seals the vent tube whereupon flow of liquid from the bottle ceases and liquid accumulated in the measuring receptacle is discharged. As the bottle is tilted back to upright position the liquid retained in the trap 15 seals the vent tube until the receptacle has been moved well past horizontal position.

The sealing of the vent tube during tilting of the container to and from pouring position prevents the discharge of an additional amount of liquid should there be a pause in the tilting movement near horizontal position and prevents pouring at an angle lower than that at which the device functions effectively.

The device of the present invention provides a simple device by means of which the liquid is measured while it is being poured and which contains liquid only during the pouring operation.

By reason of the fact that the liquid is measured during pouring the operation of the device is quite rapid. Since liquid is not retained in the measuring device, the measuring receptacle may be of relatively small size.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A device for delivering measured quantities of liquid from a supply container comprising a measuring receptacle attached to the supply container, said receptacle having an inlet through which liquid is received from the supply container when the container and receptacle are tilted and a pouring outlet, said receptacle providing a direct passage for liquid from the inlet to the outlet, said outlet being of a cross-sectional area materially less than that of said inlet, whereby the rate of flow of liquid into the receptacle in the tilted pouring position exceeds the rate of discharge through the pouring outlet and liquid accumulates in said receptacle during the pouring operation, and means controlled by the liquid accumulated above the pouring outlet and operable upon the accumulation of a predetermined volume of liquid in the tilted measuring receptacle for stopping the flow of liquid from the supply container to the receptacle while the liquid accumulated in the receptacle is discharged through the pouring outlet.

2. A device for delivering measured quantities of liquid from a supply container comprising a measuring receptacle attached to the supply container, said measuring receptacle having an inlet through which liquid is received from the supply container when the container and receptacle are tilted and a pouring outlet adjacent its outer end, said receptacle providing a direct passage for liquid from the inlet to the outlet, said outlet being of materially less cross-sectional area than said inlet, a vent tube through which air may pass from the measuring receptacle to the supply container, and means operable when said receptacle is tilted to pouring position for sealing said vent tube upon the accumulation of a predetermined volume of liquid in the measuring receptacle and for maintaining the seal during discharge of the accumulated liquid from the receptacle.

3. A device for delivering measured quantities of liquid from a supply container comprising a measuring receptacle attached to the supply container, said receptacle having an inlet through which liquid is received from the supply container when the container and receptacle are tilted and a pouring outlet, said receptacle providing a direct passage for liquid from the inlet to the outlet, said outlet being of a cross-sectional area materially less than that of said inlet, whereby the rate of flow of liquid into the receptacle in the tilted pouring position exceeds the rate of discharge through the pouring outlet and liquid accumulates in said receptacle during the pouring operation, a liquid trap within said receptacle positioned to retain liquid when the receptacle is in tilted pouring position and having an inlet opening into which liquid will flow into the trap when a predetermined volume of liquid has accumulated in the receptacle, and an air vent tube connecting the container and receptacle and having an opening within said trap whereby flow of air to the supply container is cut off by liquid in said trap.

4. A device for delivering measured quantities of liquid from a supply container comprising a measuring receptacle attached to the supply container, said receptacle having an inlet through which liquid is received from the supply container when the container and receptacle are tilted and a pouring outlet of a cross-sectional area materially less than that of said inlet, whereby the rate of flow of liquid into the receptacle in the tilted pouring position exceeds the rate of discharge through the pouring outlet, a liquid trap within said receptacle having an opening spaced laterally of said pouring outlet through which liquid will flow into the trap when a predetermined volume of liquid accumulates in the receptacle, said trap having a liquid retaining portion at the side thereof toward the pouring outlet and inwardly of said opening to retain a predetermined amount of liquid when the receptacle is in upright position and while the receptacle is being tilted past horizontal position, and an air vent tube connecting the container and receptacle and having an opening within the liquid retaining portion of the cap and spaced from each end of said liquid retaining portion a distance such that the volume of liquid trapped at the inner end of said liquid retaining portion will be clear of the vent tube opening in the upright and pouring positions and will seal the vent tube opening as the receptacle is being tilted past horizontal position.

5. A device for delivering measured quantities of liquid from a supply container comprising a measuring receptacle having means at its inner end for attachment to a supply container and provided with an inlet through which liquid flows from the container into the receptacle, said receptacle having a pouring outlet at its outer end of a cross sectional area less than that of said inlet, said receptacle being vented to the atmosphere and providing a direct passage for liquid from the inlet to the outlet, an air vent tube having its outer end within said receptacle and its inner end within the container, and a trap in the receptacle in which the outer end of said tube is disposed, said trap being positioned to retain liquid when the receptacle is in tilted pouring position and having an open side through which liquid flows freely to fill the trap and seal the vent tube upon a predetermined accumulation of liquid in the receptacle.

6. A device for delivering measured quantities of liquid from a supply container, comprising a combined discharge spout and measuring receptacle having an inlet through which liquid is received from the supply container and a pouring outlet to which the liquid passes directly from said inlet, said spout being of enlarged cross section between the inlet and outlet and said outlet being of less cross sectional area than said inlet whereby the liquid enters the spout faster than it is discharged therefrom and accumulates therein above the outlet, and means controlled by the liquid in the enlarged portion of the spout for automatically stopping the flow from the container into the spout upon the accumulation of a predetermined volume of liquid in the spout.

HENRY A. STRINGFELLOW.